United States Patent
Ganguly et al.

(10) Patent No.: US 11,593,412 B2
(45) Date of Patent: Feb. 28, 2023

(54) PROVIDING APPROXIMATE TOP-K NEAREST NEIGHBOURS USING AN INVERTED LIST

(71) Applicant: INTERNATIONAL BUSINESS MACHINES CORPORATION, Armonk, NY (US)

(72) Inventors: Debasis Ganguly, Dublin (IE); Léa Deleris, Mulhuddart (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 726 days.

(21) Appl. No.: 16/518,688

(22) Filed: Jul. 22, 2019

(65) Prior Publication Data
US 2021/0026877 A1 Jan. 28, 2021

(51) Int. Cl.
| | | |
|---|---|---|
| G06F 16/31 | (2019.01) | |
| G06F 16/33 | (2019.01) | |
| G06K 9/62 | (2022.01) | |
| G06N 3/02 | (2006.01) | |
| G06V 10/75 | (2022.01) | |

(52) U.S. Cl.
CPC ........ *G06F 16/319* (2019.01); *G06F 16/3347* (2019.01); *G06K 9/623* (2013.01); *G06K 9/6276* (2013.01); *G06N 3/02* (2013.01); *G06V 10/757* (2022.01)

(58) Field of Classification Search
CPC ............................ G06F 16/319; G06F 16/3347
USPC ............................................ 707/741
See application file for complete search history.

(56) References Cited

U.S. PATENT DOCUMENTS

| | | |
|---|---|---|
| 6,226,640 B1 | 5/2001 | Ostrovsky et al. |
| 2007/0250476 A1 | 10/2007 | Krasnik |
| 2010/0106713 A1 | 4/2010 | Esuli et al. |
| 2011/0208688 A1 | 8/2011 | Ivanov et al. |
| 2013/0060766 A1 | 3/2013 | Lin et al. |
| 2016/0042252 A1* | 2/2016 | Sawhney ............... G06F 16/55 382/190 |
| 2017/0140012 A1 | 5/2017 | Bortnikov et al. |
| 2020/0372294 A1* | 11/2020 | Koval ...................... G06N 3/04 |

FOREIGN PATENT DOCUMENTS

| | | |
|---|---|---|
| CN | 107944046 A | 4/2018 |
| EP | 3115908 A1 | 1/2017 |

OTHER PUBLICATIONS

"Product quantization for nearest neighbor search" Herve Jegou, Matthijs Douze, Cordelia Schmid Aug. 2009 (14 Pages).

* cited by examiner

*Primary Examiner* — Kimberly L Wilson
(74) *Attorney, Agent, or Firm* — Griffiths & Seaton PLLC

(57) ABSTRACT

Various embodiments are provided for implementing an approximation nearest neighbour (ANN) search in a computing environment are provided. An approximation nearest neighbour (ANN) of a plurality of feature vectors in hyperplanes with dynamically variable subspaces by searching an inverted index may be retrieved.

20 Claims, 12 Drawing Sheets

CONSTRUCTING THE INVERTED INDEX – INDEXING BY HYPER-PLANE

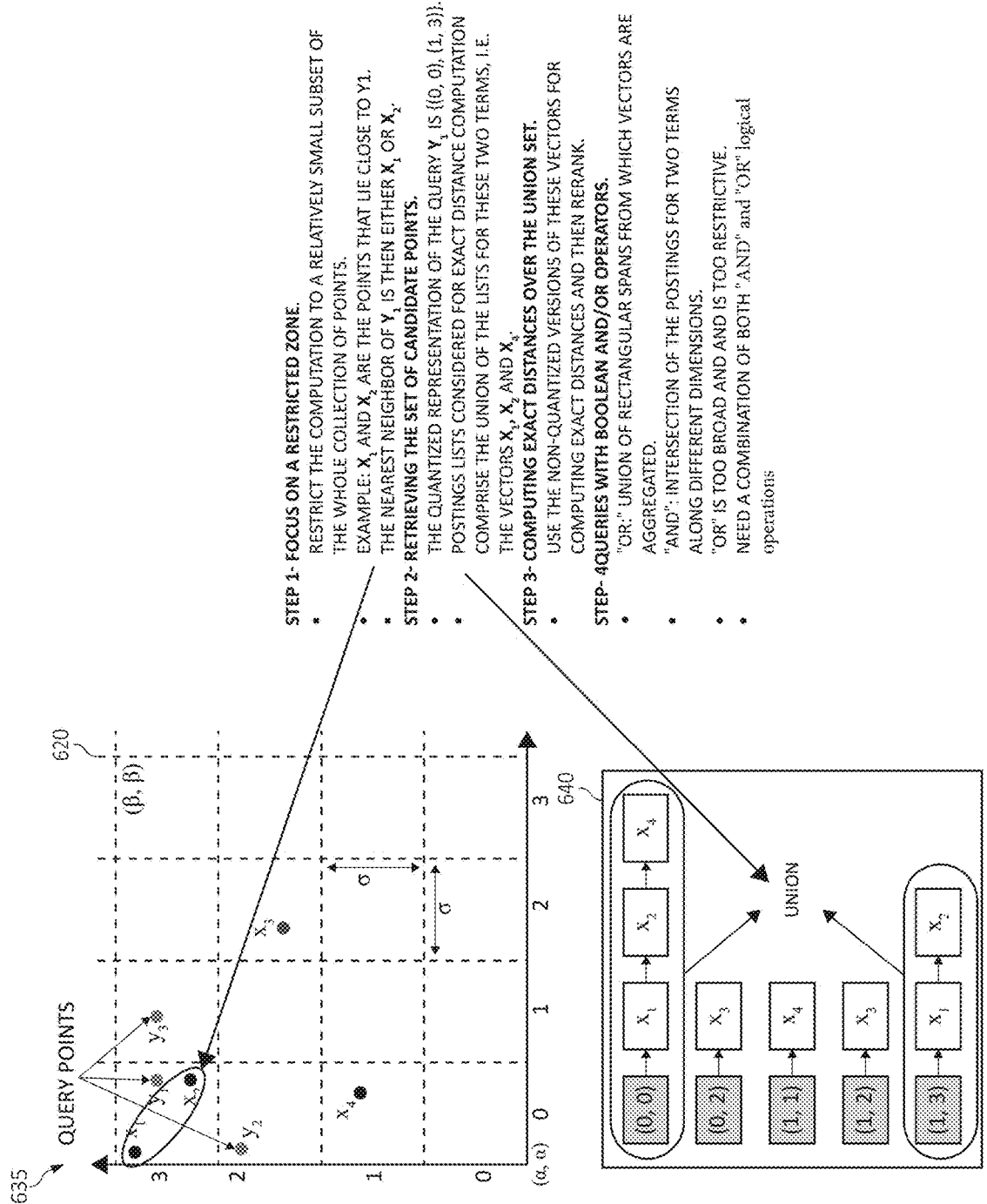

FIG. 6C

STEP 1- FOCUS ON A RESTRICTED ZONE.
- RESTRICT THE COMPUTATION TO A RELATIVELY SMALL SUBSET OF THE WHOLE COLLECTION OF POINTS.
- EXAMPLE: $x_1$ AND $x_2$ ARE THE POINTS THAT LIE CLOSE TO $y_1$. THE NEAREST NEIGHBOR OF $y_1$ IS THEN EITHER $x_1$ OR $x_2$.

STEP 2- RETRIEVING THE SET OF CANDIDATE POINTS.
- THE QUANTIZED REPRESENTATION OF THE QUERY $Y_1$ IS {(0, 0), (1, 3)}. POSTINGS LISTS CONSIDERED FOR EXACT DISTANCE COMPUTATION COMPRISE THE UNION OF THE LISTS FOR THESE TWO TERMS, I.E. THE VECTORS $x_1$, $x_2$ AND $x_3$.

STEP 3- COMPUTING EXACT DISTANCES OVER THE UNION SET.
- USE THE NON-QUANTIZED VERSIONS OF THESE VECTORS FOR COMPUTING EXACT DISTANCES AND THEN RERANK.

STEP- 4 QUERIES WITH BOOLEAN AND/OR OPERATORS.
- "OR": UNION OF RECTANGULAR SPANS FROM WHICH VECTORS ARE AGGREGATED.
- "AND": INTERSECTION OF THE POSTINGS FOR TWO TERMS ALONG DIFFERENT DIMENSIONS.
- "OR" IS TOO BROAD AND AND IS TOO RESTRICTIVE. NEED A COMBINATION OF BOTH "AND" and "OR" logical operations

PROVIDING APPROXIMATE TOP-K NEAREST NEIGHBOURS USING AN INVERTED LIST

BACKGROUND OF THE INVENTION

Field of the Invention

The present invention relates in general to computing systems, and more particularly to, various embodiments for providing an approximate top-k nearest neighbours using an inverted list using a computing processor.

Description of the Related Art

Computing systems may be found in the workplace, at home, or at school. Due to the recent advancement of information technology and the growing popularity of the Internet, a wide variety of computer systems have been used in machine learning. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and/or retrieving various amounts of information is a key problem to solve. As great strides and advances in technologies come to fruition, these technological advances can be then brought to bear in everyday life.

SUMMARY OF THE INVENTION

Various embodiments for provided for implementing an approximation nearest neighbour (ANN) search in a computing environment are provided. In one embodiment, by way of example only, a method for providing an approximate top-k nearest neighbours using an inverted list. An approximation nearest neighbour (ANN) of a plurality of feature vectors in hyper-planes with dynamically variable subspaces by searching an inverted index may be retrieved.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A-6D is a diagram depicting various operations for approximation nearest neighbour ("ANN") search in accordance with aspects of the present invention;

DETAILED DESCRIPTION OF THE DRAWINGS

Figure 1:
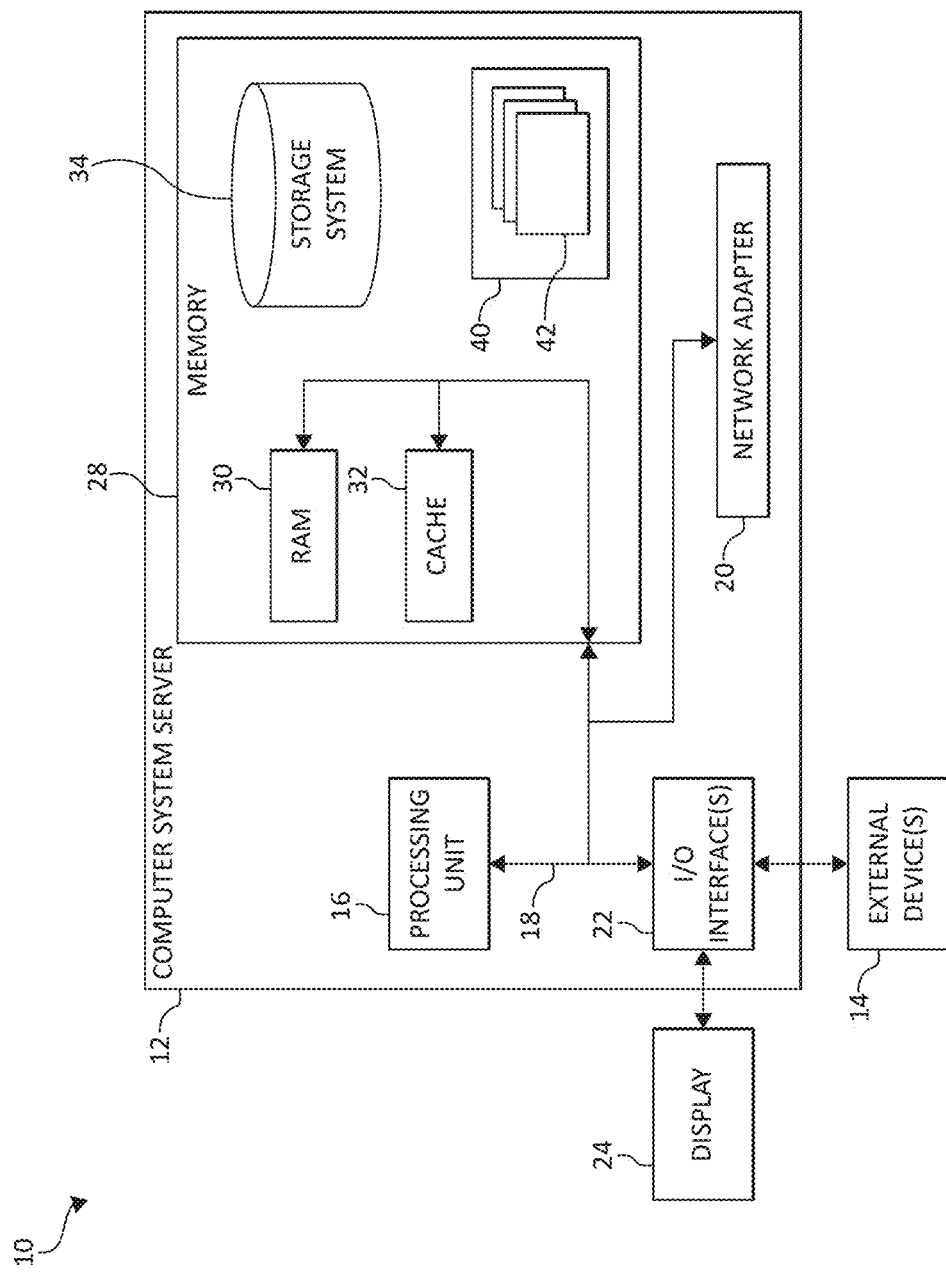
FIG. 1 is a block diagram depicting an exemplary cloud computing node according to an embodiment of the present invention.

As a preliminary matter, nearest neighbour searching ("NNS") is searching for objects in a data space that are similar to a user-selected object, with the user-selected object defining a query. For example, a user can select a digital image and use the image as a query to a data base for images that are similar to the user-selected digital image. In response to the query, the "k" closest images are returned, where "k" is an integer defined by the user or search engine designer. These "k" images are referred to as the "k" nearest neighbors to the image that was used as the query, and for indexing and search purposes they are typically considered to be multidimensional data points "P" that are close to a multidimensional data point "Q" representing the query. Other non-limiting examples of applications that use nearest neighbour searching include video databases, data mining, pattern classification, and machine learning.

The NNS is a key element in a variety of machine learning tasks such as, for example, classification (e.g., k-NN approaches), recommender systems (e.g., collaborative filtering), clustering, document retrieval, and the like. Also, NNS is particularly useful in the area of deep learning driven artificial intelligence (e.g., multi-modal embedding spaces). For example, consider a multi-modal search using a large number of vectors (e.g., several millions) and large number of dimensions (e.g., several hundreds). Documents and queries may be represented as sets of multi-modal vectors in a joint embedded space. Queries can be arbitrary regions selected from the documents. A top-k ANN search may efficiently retrieve a set of other documents given a query of selected region of a multi-modal document.

In recent years, NNS is an important problem for consideration in various applications, including, for example, e-commence product searches, web searches, image retrieval, data mining, pattern recognition, and data compression. The problem can be formally described as follows. Given a set S of data points, the task is to process these data points so that, given any query data point q, the data point nearest to G (with respect to a certain distance measure) can be reported quickly. Said differently, given a query vector Q and a collection C, retrieve from C the true nearest neighbors from Q.

In many applications, users are satisfied with finding an approximate answer that is "close enough" to the exact answer. A number of techniques have been proposed or suggested for determining an approximate neatest neighbour ("ANN"), especially for high-dimensional data retrieval since exact nearest neighbour retrieval can become very inefficient in such settings. That is, the ANN provides an approximate solution to a true nearest neighbour problem. However, the ANN needs to be fast (e.g., less than the computationally expensive problem O(Nd), where O is the operation, N is the number of data points in the collection and d is the dimension. The ANN needs to also scale to large sized collections (e.g., billions of documents that may exist in "big data"). Accordingly, a need exists for improved methods and systems for approximate top-k nearest neighbour searches using an inverted list (e.g., an inverted index).

Thus, the present invention preserves and maintains data security in a shared computing file system. The present invention may be used as input 1) a set S of real-valued vectors of high dimension, e.g., a set of image feature vectors, such as output from f6 layer of ImageNet (where "f6" refers to a fully connected sixth layer in a standard ImageNet architecture, which presumably captures an abstract representation of the raw pixels of an image), and/or word vectors trained with neural models, and 2) a query vector Q belonging to the same feature space.

During an offline process, the present invention may transform each feature vector to a document comprising pseudo-terms. Each pseudo-term may correspond to a projection of a point along a single dimension. The present invention may store these transformed documents into a standard search system inverted index.

During an online process, mechanisms of the illustrated embodiments may transform the query into a document comprising pseudo-query terms. The present invention may construct subspaces of higher dimensions by performing a logical operation (e.g., an "AND" operation) on the query terms (e.g., AND-ing the query terms). The present invention may stop/terminate the increasing/growing subspace and start/commences a new subspace when the number of points in a subspace is less than a defined value (e.g., number of points is less than k (e.g., #NN desired). A union of points lying within these subspaces may be constructed. The union list may be reranked by determining/computing true (e.g., "exact") similarity values. In one aspect, an "exact" similarity value in this case may refer to a metric on which the nearest neighbors are sought (e.g., a maximum cosine similarity or minimum Euclidean distance). As output, the present invention may provide a set of top K most (approximately) similar vectors to the query vector Q.

In an additional aspect, the present invention provides for indexing a collection of feature vectors using hyper-planes. One or more projected subspaces may be dynamically increased in some permutation order of the dimensions. A union of the points in those subspaces may be determined. A true similarity computation may be restricted only on the members of the union set. The restricted union set, due to the sparsity of a high dimensional space, is typically much smaller in size than the number of data points on which NNS is conducted and hence is much faster.

In another aspect, mechanisms of the illustrated embodiments may retrieve approximate top-k nearest neighbors by searching on an inverted list data structure (e.g., inverted index) with variable subspace projections. A collection of feature vectors may be indexed using hyper-planes. The role of each hyper-plane is to define an entry (pseudo-term) in an inverted index data structure for efficient retrieval of approximate nearest neighbours. The index output may be read with dynamically growing projected subspaces in permutation order of dimensions and computing union of points in subspaces with restriction of true similarity computation on union set.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
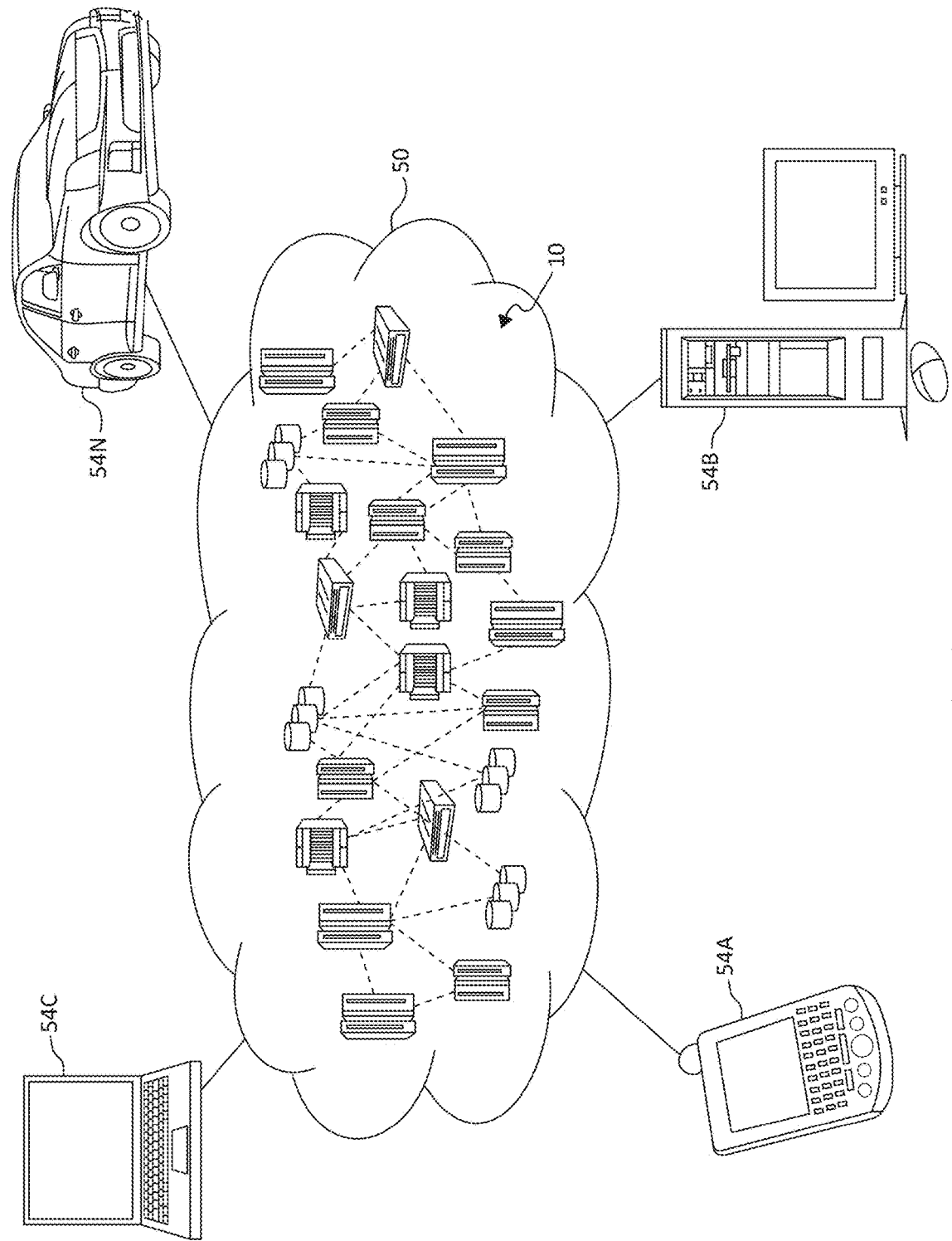
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
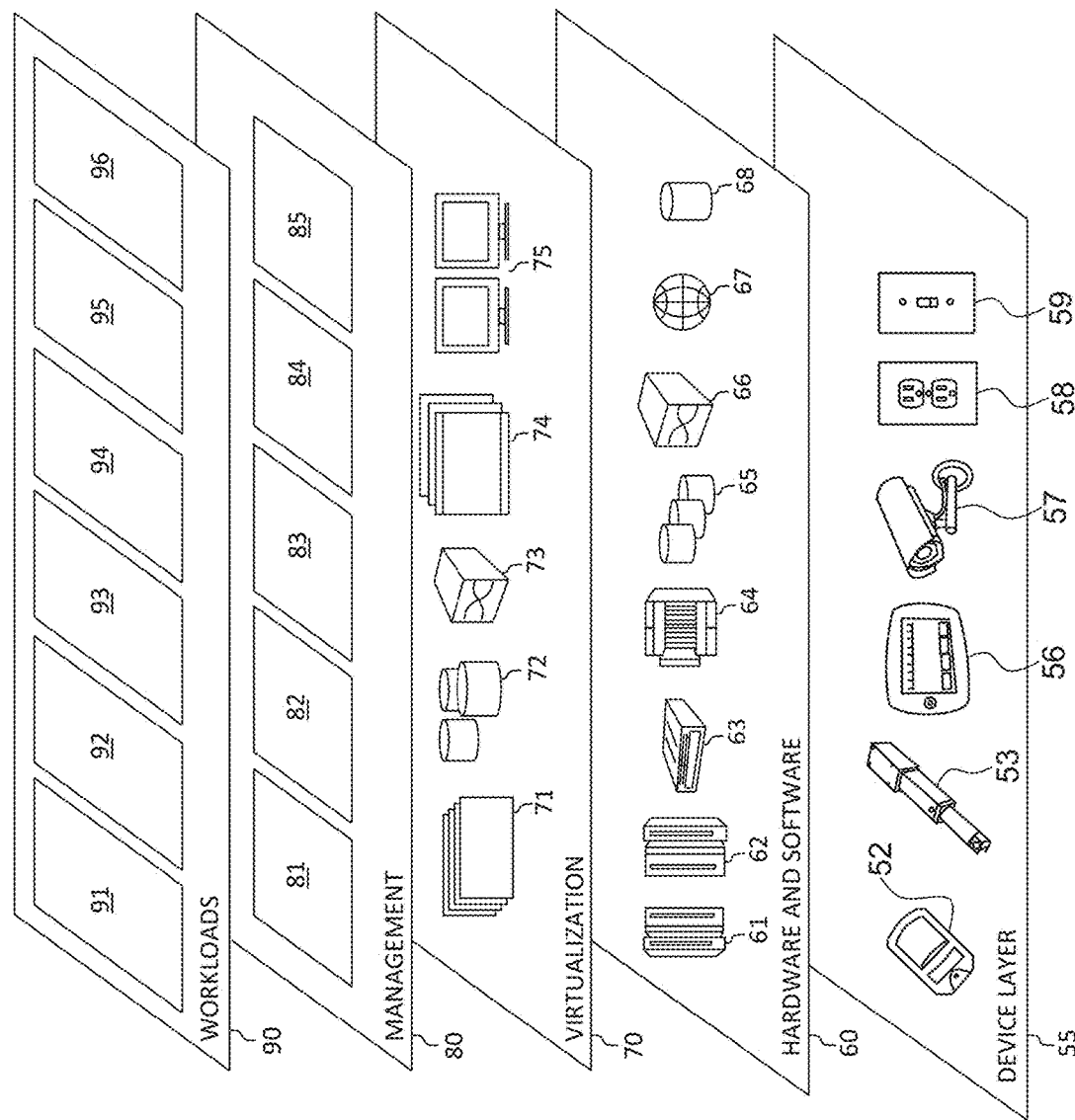
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing an approximation nearest neighbour ("ANN") search. In addition, workloads and functions 96 for implementing an ANN search may include such operations as data analysis (including data collection and processing) and data analytics functions. One of ordinary skill in the art will appreciate that the workloads and functions 96 for implementing an ANN search may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
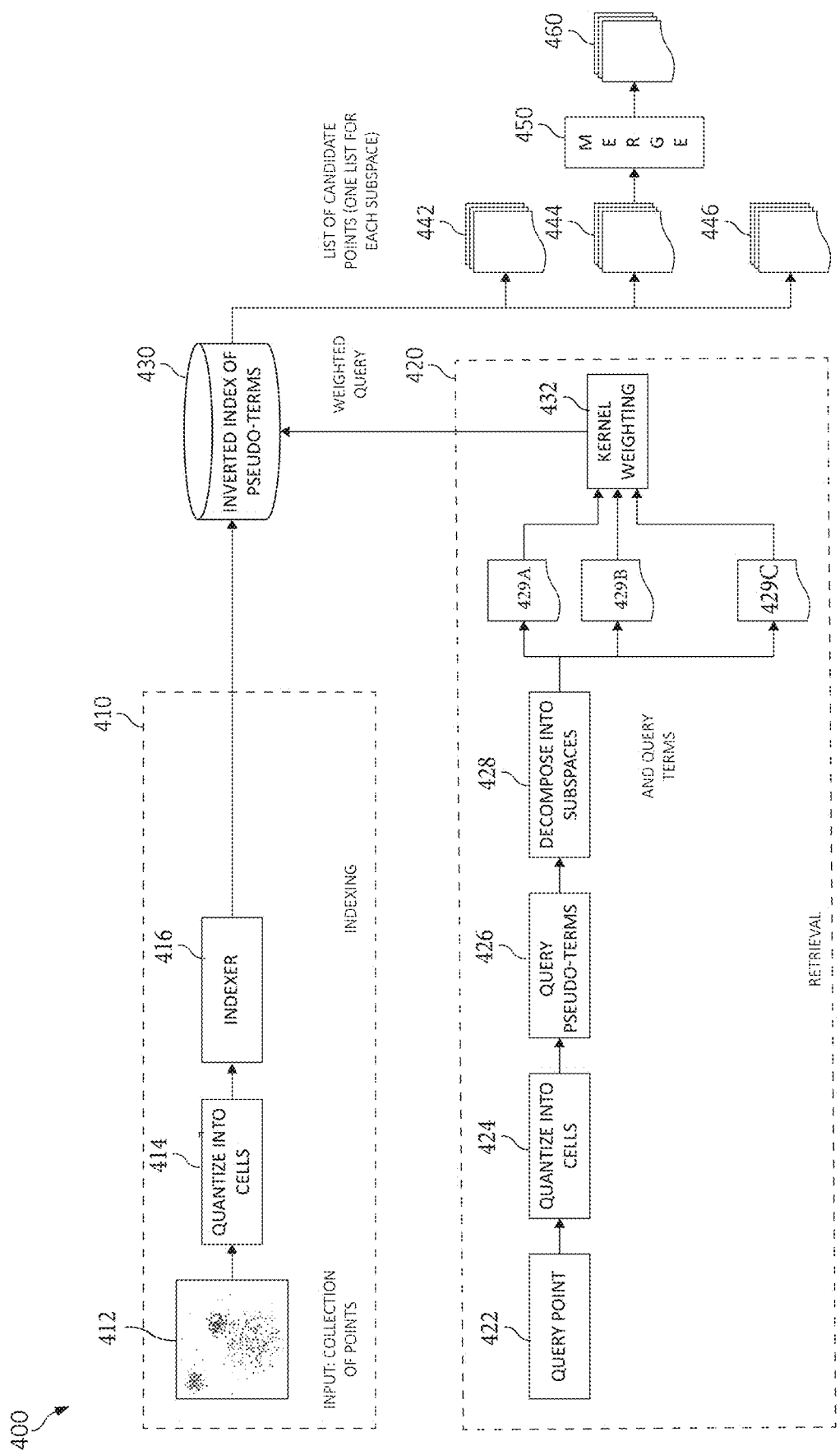
FIG. 4 is an additional block diagram depicting exemplary operations for approximation nearest neighbour ("ANN") search in accordance with aspects of the present invention.

Turning now to FIG. 4, a block diagram of exemplary functionality 400 relating to implementing an ANN search using an inverted list (e.g., inverted index) is depicted according to various aspects of the present invention. In one aspect, one or more of the components, modules, services, applications, and/or functions described in FIGS. 1-3 may be used in FIG. 4.

As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" or "components" of functionality. With the foregoing in mind, the module blocks 400 may also be incorporated into various hardware and software components of a system for implementing an approximation nearest neighbour (ANN) search in accordance with the present invention. Many of the functional blocks 400 may execute as background processes on various components, either in distributed computing components, or on the user device, or elsewhere.

Starting with block 410, for performing an indexing operation, a collection of data points 412 may be collected, identified, used, or received as input (e.g., "input collection of data points"). The data points 412 may be quantized into one or more of a plurality of cells of a table, as indicated in descriptive block 414. An indexer 416 may index the collection of real-valued vectors using an inverted list data structure using one or more hyper planes (a hyper-plane indicates a well-defined region in space, e.g., for three-dimensional ("3D") space it can refer to a particular plane such as, for example, the X-Y plane), which may be stored in an inverted index of pseudo-terms 430.

Turning now to block 420, for performing a retrieval operation, a query point 422 may be quantized into one or more of a plurality of cells of a table, as indicated in descriptive block 424. The quantized cells may include one or more query pseudo-terms. Each query pseudo-term may correspond to a projection of the query point along a single dimension in a hyper plane. The query pseudo-terms 426 may be decomposed into one or more subspaces of higher dimensions, as in block 428 by performing a logical operation (e.g., an "AND" operation) on the query pseudo-terms (e.g., ANDing the query terms). A union of data points 429A-C lying in these subspaces may be constructed. A weighting function can be applied on each retrieved member (data instance) of the union list to selectively prioritize a set of points over the other, as in block 432. More specifically, the weights can be defined by a (kernel) function that monotonically decreases as one goes farther and farther away from the coordinates of the query point. This kernel weighted query may then be used to retrieve a list of candidate points from the index (430).

As output, a list of one or more candidate points (e.g., one list for each subspace) such as, for example, candidate points 442, 444, and/or 446 may be provided and merged, as in block 450. The merged list of candidate points 442, 444, and/or 446 may be provided as a set of top K most (approximately) similar vectors to the query vector Q, as in block 460.

Figure 5:
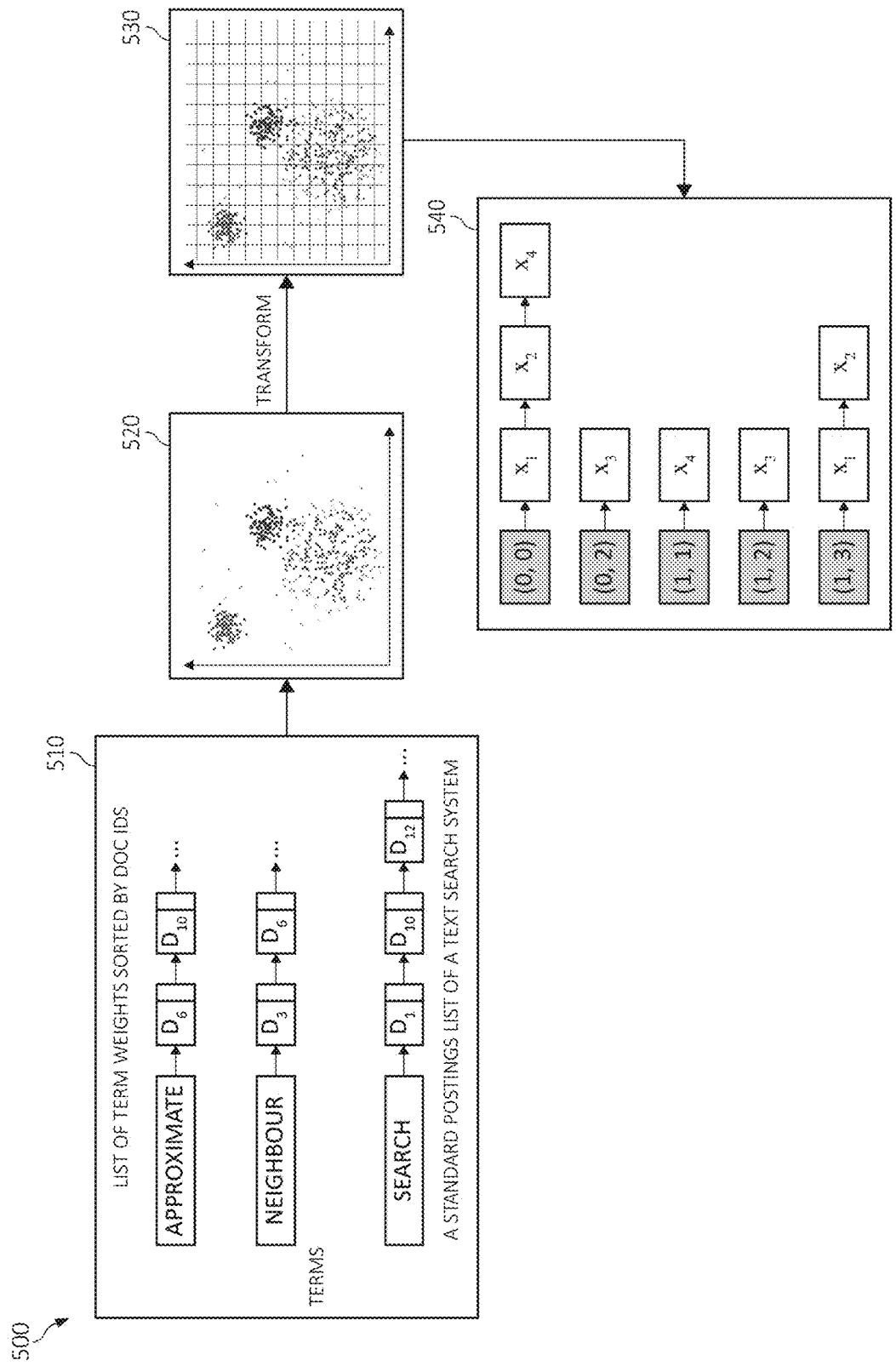
FIG. 5 is a diagram depicting exemplary operations for approximation nearest neighbour ("ANN") search in accordance with aspects of the present invention.

Turning now to FIG. 5, a block diagram of exemplary functionality 500 relating to implementing the ANN search using an inverted list (e.g., inverted index) is depicted according to various aspects of the present invention. In one aspect, one or more of the components, modules, services, applications, and/or functions described in FIGS. 1-4 may be used in FIG. That is, one or more components, functionalities, and/or features of FIGS. 1-4 may be implemented in FIG. 5. Repetitive description of like elements, components, modules, services, applications, and/or functions employed in other embodiments described herein is omitted for sake of brevity.

Starting in block 510, a list of terms (e.g., semantic terms such as, for example, "approximate," "neighbor," and "search") with a pointer (e.g., arrow) pointing to a list of documents (e.g., a list of terms weights sorted by document ("doc") identifiers ("IDs") containing that particular term. Thus, by way of example only, a list of documents are provided for the term "approximate," a list of documents are provided for the term "neighbor," and a list of documents are provided for the term "search," may be provided as a posting list of a text search system. A logical operation (e.g., an "AND" operation) may be performed over each list to identify those documents (e.g., an intersection) of all three terms over each of the lists, which may be used for block 520.

A collection of real-valued vectors (e.g., feature vectors) may be indexed using an inverted list data structure, as in block 530. In one aspect, the real-valued vectors may be transformed into query pseudo-terms for the indexing. Said differently, the real-valued vectors may be transformed into a document having one or more pseudo-query terms and the one or more pseudo-query terms correspond to a projection of one or more data points in dynamically variable subspaces. That is, a vector space (e.g., a p-dimensional vector space, where "p" is equal to 2) that may include a variable number of cells depending on the quantization interval (size of each cell) as depicted in block 530. One or more of the cells in the p-dimensional vector space may include one or more points that may represent the one or more pseudo-query terms.

Figure 6A:
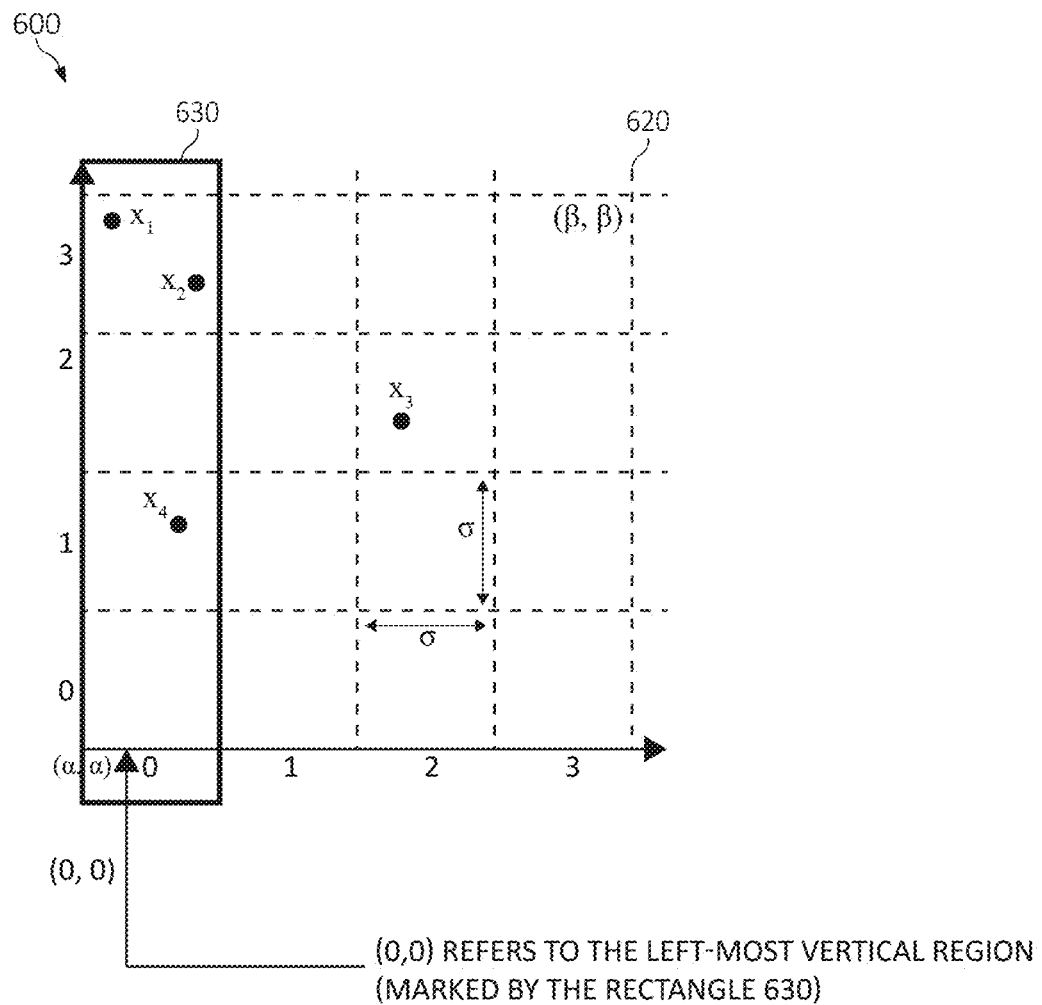
Figure 6B:
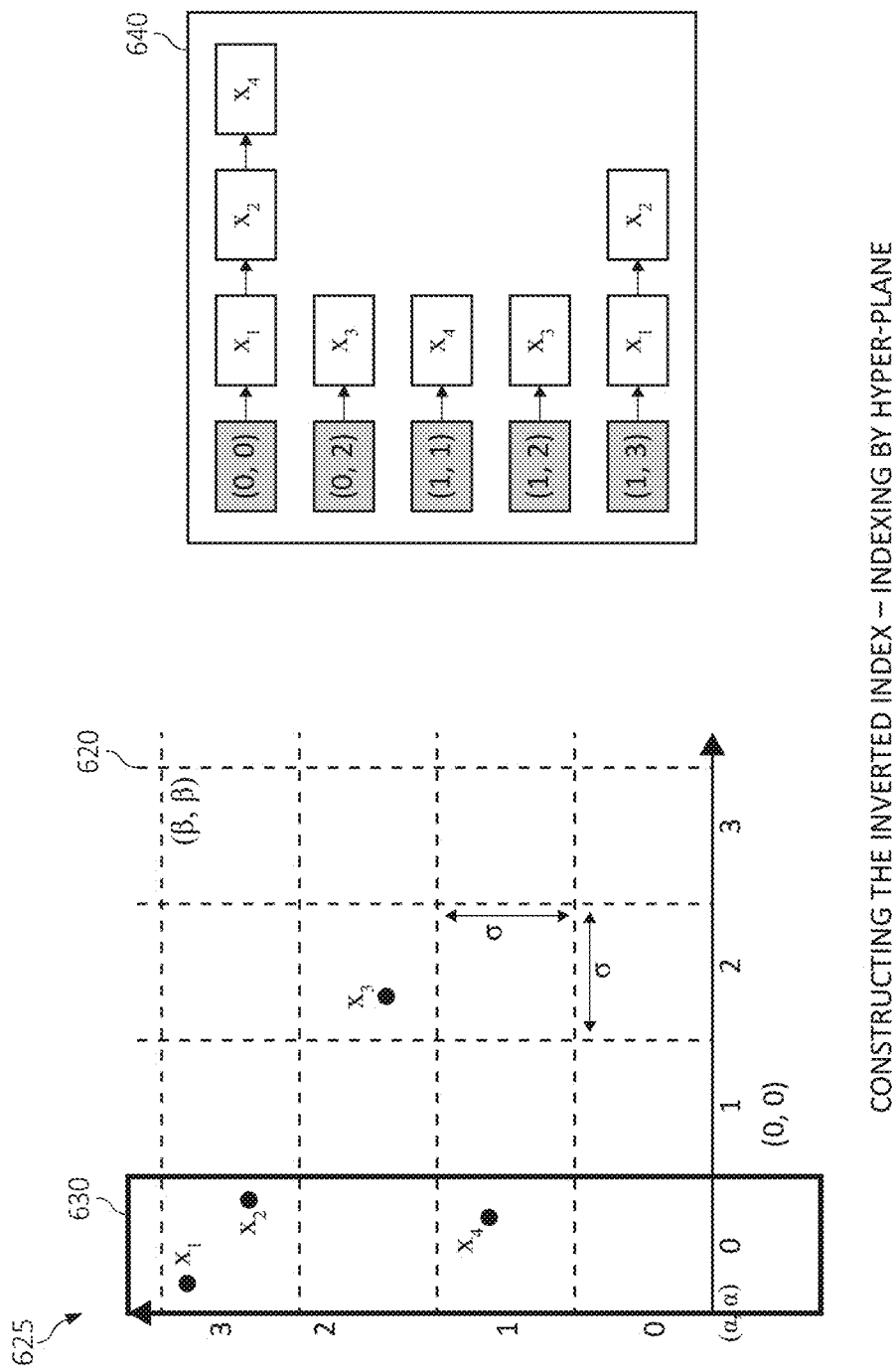

Block 540 depicts constructing an inverted index using hyper plans (see also 640 of FIG. 6B). Thus, given a data point, a list of pseudo-terms may be generated, created, and/or identified (see block 540) where the pseudo-terms are represented as data points contained in one or more of the cells of the vector space grid, as depicted in block 530.

To further explain the operations of FIG. 5, consider diagrams 600, 625 635, and 645 for implementing the ANN search using an inverted list (e.g., inverted index).

In FIG. 6A, the vector space may split into vector space grids (see block 530 of FIG. 5). To split the grid, a point X may be transformed, where X may be equal to $X_0, X_2, X_{d-1}$, where d is a number of dimensions. A query pseudo-term may be a 2-tuple of the form (i,j), where "i" is a dimension identifier (e.g., a number between d-1) and "j" is an offset of a cell in which a data point is located. Furthermore, the "α" in vector space grid 620 may be a minimum coordinate and the β may be the maximum coordinate along each dimension d. "M" may be a number of equi-spaced intervals along an axis and the δ is a cell width. In two dimensions, the $0^{th}$ dimension may refer to a vertical region. For example, (0,0) may refer to the left-most vertical region 630, which may be described as a hyper plane. That is, region 630 is a hyper plane. Also, the query points $X_1$ and $X_2$ are included in the cell (0,3), which is included in the hyper plane 630.

Turning now to FIG. 6B, an inverted index 640 is constructed from the vector space grid 620 (e.g., indexing by hyper-plane). For example, the term (0,0) in the inverted index 640 contains a vector "x" if the 0-th component of x is quantized to a value of 0. The term (0,0) may contain all vectors (e.g., $X_1$, $X_2$ and $X_4$ in the hyper plane 630) that lie in this region. Since the first (0-th) component of query points $X_1$, $X_2$ and $X_4$ is 0, these three vectors are added to the postings list of the term (0,0). Similarly, since the second component of the vectors $X_1$ and $X_2$ are 3, these two vectors may be added to the postings of the term (1,3). For example, the first "0" in (0,0) reflects the 0-th axis (x-axis) and the second "0" in (0,0) indicates the 0-th hyperplane along this axis is being considered.

Turning now to FIG. 6C, depict an operation for retrieving ANNs for a query. In step 1, the operation for retrieving ANNs for a query may focus on a restricted zone (of the vector space grid 620). That is, retrieving the ANNs for the query may be restricted to a relatively small subset of an entire collection of data points such as, for example, the data points $X_1$ and $X_2$ that lie close to $Y_1$ on the vector space grid 620. The nearest neighbor of $Y_1$ may then be either $X_1$ or $X_2$.

In step 2, a set of candidate points may be retrieved. The quantized representation of the query $Y_1$ may be {(0, 0), (1, 3)}. The postings lists considered for exact distance computation may include the union of the lists for these two terms, i.e. the vectors $X_1$, $X_2$, and $X_4$. In step 3, an exact distance over the union set may be determined/computed. For example, the non-quantized versions of these vectors may be used for computing the exact distances and then rerank.

It should be noted that each query may include a Boolean and one or more logical operations (e.g., using a combination of "AND" operation and an "OR" operation). In one aspect, the AND operation enables restriction of a subspace of the overall vector space grid 620. Using the combination of "AND" operation and an "OR" operation overcomes the challenges presented with being too broad (e.g., the OR operation) or too restrictive (e.g., the AND operation).

The OR operation may enable a union of rectangular spans from which vectors are aggregated. The AND operation may include an intersection of the postings for two terms along different dimensions.

Figure 6D:
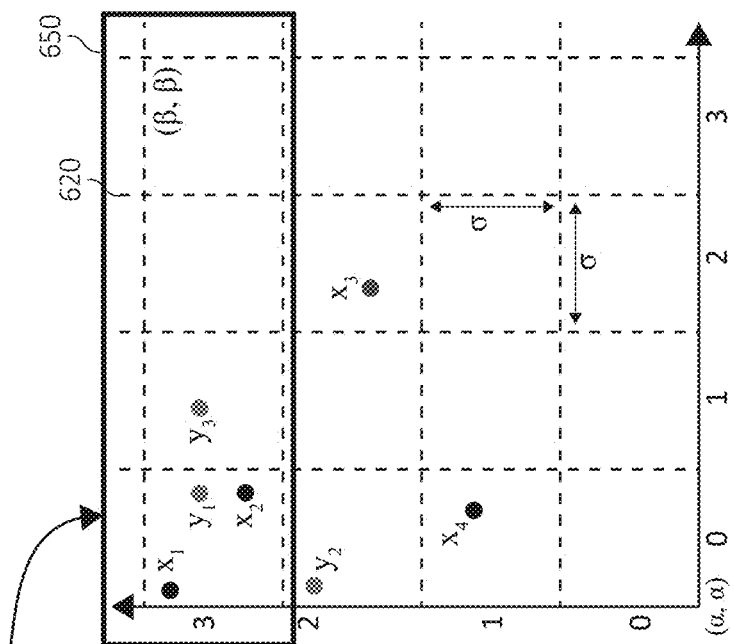

Thus, each term in the inverted list corresponds to a particular subset of the set of the 1 infinity ("∞") balls (also known as the "infinity norm" or $L_\infty$-norm and may be defined as the maximum of the absolute values of its components) that spans the entire space (e.g., entire vector space grid 620), as illustrated in FIG. 6D. That is, the vector space grid 620 (although only illustrated with four cells in each axis) may be increasing in variable subspaces and thus may be referred to as infinity norm (or infinity balls). Also, the hyper plan or area 650 may also be infinity.

For example, the term (1,3) of FIG. 6D may be the area 650 that is spanned by the 4 cells in the top row (a projected subspace resulting from a query term). If a query vector is close to a document vector, their projections in the individual subspaces should also be close. The logical operation (e.g., Boolean AND operation) between the query terms may result in an intersection of the postings for two terms along different dimensions. The AND operator over k-query terms represents a set of projected points that are close to the k-dimensional projection of the query point along the specified dimensions (corresponding to query terms) and may be too restrictive if k increases such as, for example, as the dimension of this subspace increases it becomes less likely to find a candidate point in a well-defined region (as specified by the query cell) of this space due to the sparse nature of high dimensional spaces. Thus, subspaces of a vector space grid may be built up/identified that does not span the entire vector space grid (e.g., two-dimensional or three dimensional in an overall eight dimensional space) to identify one or more candidates of query vector points and a logical operation enables identification of the union/intersection of all the subspaces of the vector space grid to provide an exhaustive and final list of one or more candidate query vector points.

Figure 7:
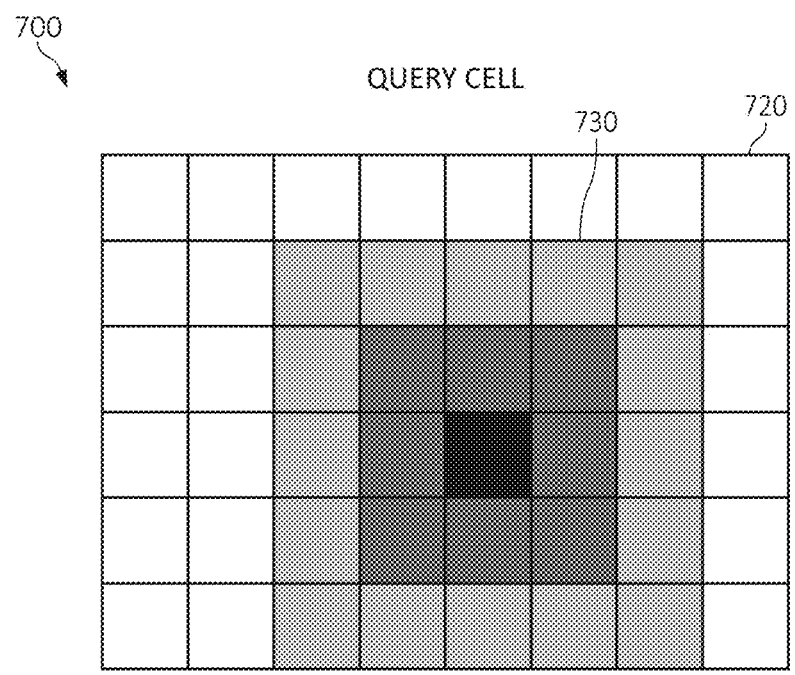
FIG. 7 an additional block diagram depicting an example of extended subspace projection in accordance with aspects of the present invention.

Turning now to FIG. 7, diagram 700 depicts an example of extended subspace projection in accordance with aspects of the present invention. Also, one or more components, functionalities, and/or features of FIGS. 1-6A-6D may be implemented in FIG. 7. That is, one or more components, functionalities, and/or features of FIGS. 1-6A-6D may be implemented in FIG. 7. Repetitive description of like elements, components, modules, services, applications, and/or functions employed in other embodiments described herein is omitted for sake of brevity. It should be noted that the shaded boxes in FIG. 7 represents an expanded region (cell) so that the chances of finding a point in the neighborhood (of this query cell) increases. A common example is: adding the words "nuclear" and "energy" to the query "atomic power" so that it becomes likely that more relevant documents are retrieved in the candidate list.

A vector space grid 720 is depicted with a query cell 730 depicted with a kernel around the query cell 730 for weighted matching. A logical operation (e.g., a Boolean OR operation) may be used to alleviate too restrictive subspaces. The query cell 730 may define a (weighted) union of regions or cells in a sub-space. The weights tend to increase (e.g., depicted with the various shades becoming darker) closer to the query cell 730 and decrease further away (two-dimensional case is shown alongside). The kernel extend subspace projection may be similar to a query expansion which allows for more candidate points being retrieved (i.e., potentially aiming for high recall) at the cost of including potentially more non-relevant matches in the candidate set of query points. Also, the kernel extend subspace projection enables the combination of at least two logical operations (e.g., the AND and the OR operators). The process may continue on adding conjunction terms (extend subspace) until the number of retrieved candidates falls below a threshold.

The ANN algorithm of the operations described herein may be further illustrated, by way of example only, using the following pseudocode. Also, as indicated in the pseudo code below "T" is the size of expansion and in FIG. 7 the variable T is equal to 2 (e.g., T=2). T equal to 0 (e.g., T=0) would only give the darkest square in the center. T equal to 1 (e.g., T=1) gives the dark gray region, but T equal to 2 includes the lighter gray regions.

```
Subspace-Projection-Retrieval (start)
    For j=start; j<=p; do // p ó number of dimensions
        Q β 0; // Boolean AND for subspace matching
        For t = –T to T do // Adjacent cells and "T" is the size of expansion
            Add (AND) term (j+t) with weight exp(–t²/σ) to Q // Kernel
                weighted
        Retrieve a ranked list (L) of top-M vectors.
        If size of L < Threshold
            Return (j, L); then do not grow this subspace further.
        start := 0; L := { }
        While (start < p) // Accumulate the candidate points from each
        subspace.
            (next, SP) β Subspace-Projection-Retrieval(start, L)
            L := L U SP; start := start + next.
```

Figure 8:
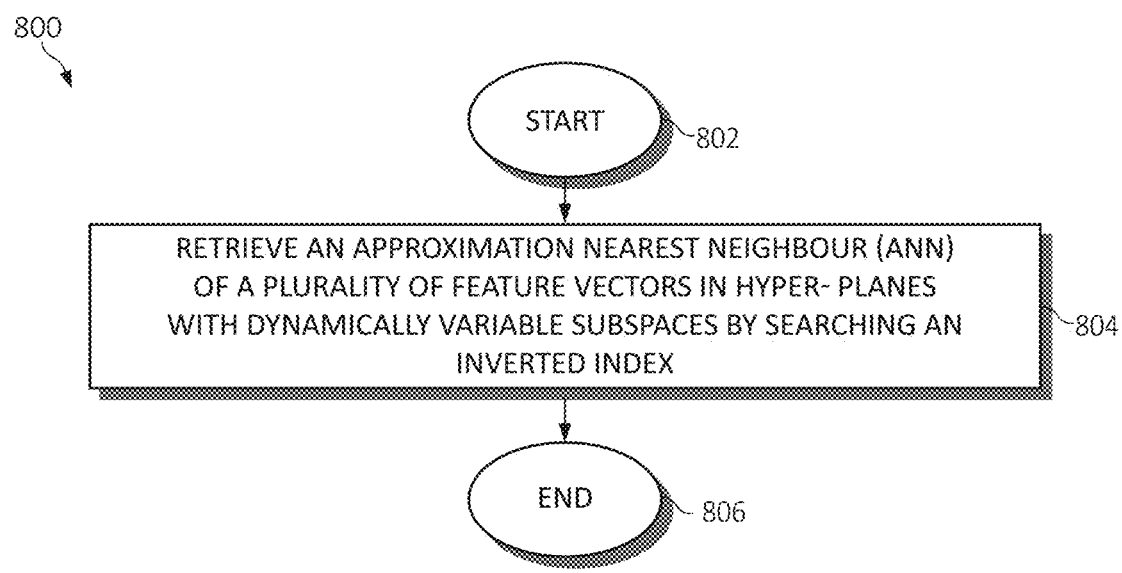
FIG. 8 is a flowchart diagram depicting an exemplary method for implementing an approximation nearest neighbour ("ANN") search in a computing environment in a computing environment in which aspects of the present invention may be realized.

Turning now to FIG. 8, a method 800 for implementing an approximation nearest neighbour (ANN) search using an inverted index in a computing environment is depicted, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 800 may start in block 802.

An approximation nearest neighbour (ANN) of a plurality of feature vectors in hyper-planes with dynamically variable subspaces may be retrieved by searching an inverted index, as in block 804. The functionality 800 may end in block 806.

Figure 9:
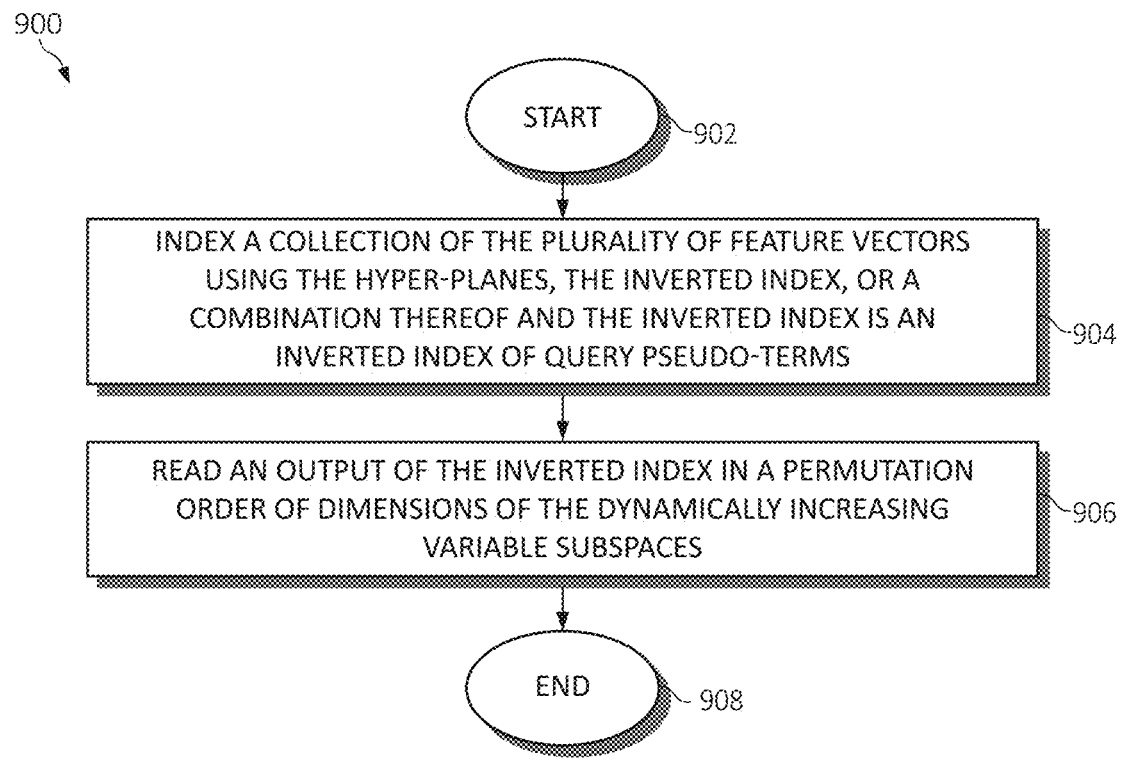
FIG. 9 is a flowchart diagram depicting an additional exemplary method for implementing an approximation nearest neighbour ("ANN") search in a computing environment in a computing environment in which aspects of the present invention may be realized.

Turning now to FIG. 9, a method 900 for implementing an approximation nearest neighbour (ANN) search using an inverted index in a computing environment is depicted, in which various aspects of the illustrated embodiments may be implemented. The functionality 900 may be implemented as a method executed as instructions on a machine, where the instructions are included on at least one computer readable storage medium or one non-transitory machine-readable storage medium. The functionality 900 may start in block 902.

A collection of the plurality of feature vectors may be ed using the hyper-planes, an inverted ind a combination thereof, as in block 904. The inverted index may be an inverted index of query pseudo-terms. An output of the inverted index may be read in a permutation order of dimensions of the dynamically increasing variable subspaces, as in block 906. The functionality 900 may end in block 908.

In one aspect, in conjunction with and/or as part of at least one block of FIGS. 8-9, the operations 800 and/or 900 may include one or more of each of the following. The operations of 800 and/or 900 may determine one or more union sets of one or more union points in the dynamically variable subspaces. The dynamically variable subspaces are increasing. The operations of 800 and/or 900 may restrict a true similarity computation on the union set.

The operations of 800 and/or 900 may use the inverted indexes to index the plurality of feature vectors in the dynamically variable subspaces and determine exact distance of the plurality of feature vectors that are stored in a secondary storage.

The operations of 800 and/or 900 may transform each of the plurality of feature vectors into a document having one or more pseudo-query terms, wherein the one or more pseudo-query terms correspond to a projection of one or more data points in the dynamically variable subspaces, determine one or more dynamically increasing variable subspaces and performing a selected logical operation on the one or more pseudo-query terms, determine one or more union sets of one or more union of the one or more data points in the dynamically variable subspaces, and/or rank or re-rank a list of the union sets upon determining an exact similarity value of the one or more pseudo-query terms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for implementing an approximation nearest neighbour (ANN) search in a computing environment, comprising:
retrieving an approximation nearest neighbour (ANN) of a plurality of feature vectors in hyper-planes with dynamically variable subspaces by searching an inverted index, wherein the plurality of feature vectors, comprising real-valued vectors, are transformed into query pseudo-terms corresponding to a projection of one or more data points in a p-dimensional vector space having a variable number of cells depending upon a quantization interval, and wherein one or more of the variable number of cells in the p-dimensional vector space includes the one or more data points representing the query pseudo-terms.

2. The method of claim 1, further including indexing a collection of the plurality of feature vectors using the hyper-planes, the inverted index, or a combination thereof.

3. The method of claim 1, further including reading an output of the inverted index in a permutation order of dimensions of the dynamically variable subspaces.

4. The method of claim 3, further including determining one or more union sets of one or more union points in the dynamically variable subspaces, wherein the dynamically variable subspaces are increasing.

5. The method of claim 4, further including restricting a true similarity computation on the union set.

6. The method of claim 1, further including:
using the inverted index to index the plurality of feature vectors in the dynamically variable subspaces; and
determining exact distance of the plurality of feature vectors that are stored in a secondary storage.

7. The method of claim 1, further including:
performing the transforming of each of the plurality of feature vectors into a document having one or more of the pseudo-query terms, wherein the one or more of the pseudo-query terms correspond to a projection of one or more data points in the dynamically variable subspaces;
determining one or more dynamically increasing variable subspaces and performing a selected logical operation on the one or more of the pseudo-query terms;
determining one or more union sets of one or more union of the one or more data points in the dynamically variable subspaces; and
ranking or re-ranking a list of the union sets upon determining an exact similarity value of the one or more of the pseudo-query terms.

8. A system for implementing an approximation nearest neighbour (ANN) search in a computing environment, comprising:
one or more computers with executable instructions that when executed cause the system to:
retrieve an approximation nearest neighbour (ANN) of a plurality of feature vectors in hyper-planes with dynamically variable subspaces by searching an inverted index, wherein the plurality of feature vectors, comprising real-valued vectors, are transformed into query pseudo-terms corresponding to a projection of one or more data points in a p-dimensional vector space having a variable number of cells depending upon a quantization interval, and wherein one or more of the variable number of cells in the p-dimensional vector space includes the one or more data points representing the query pseudo-terms.

9. The system of claim 8, wherein the executable instructions index a collection of the plurality of feature vectors using the hyper-planes, the inverted index, or a combination thereof.

10. The system of claim 8, wherein the executable instructions read an output of the inverted index in a permutation order of dimensions of the dynamically variable subspaces.

11. The system of claim 10, wherein the executable instructions determine one or more union sets of one or more union points in the dynamically variable subspaces, wherein the dynamically variable subspaces are increasing.

12. The system of claim 11, wherein the executable instructions restrict a true similarity computation on the union set.

13. The system of claim 8, wherein the executable instructions:
use the inverted index to index the plurality of feature vectors in the dynamically variable subspaces; and
determine exact distance of the plurality of feature vectors that are stored in a secondary storage.

14. The system of claim 8, wherein the executable instructions:
perform the transforming of each of the plurality of feature vectors into a document having one or more of the pseudo-query terms, wherein the one or more of the pseudo-query terms correspond to a projection of one or more data points in the dynamically variable subspaces;

determine one or more dynamically increasing variable subspaces and performing a selected logical operation on the one or more of the pseudo-query terms;

determine one or more union sets of one or more union of the one or more data points in the dynamically variable subspaces; and rank or re-rank a list of the union sets upon determining an exact similarity value of the one or more of the pseudo-query terms.

15. A computer program product for implementing an approximation nearest neighbour (ANN) search in a computing environment using one or more processors, the computer program product comprising a non-transitory computer-readable storage medium having computer-readable program code portions stored therein, the computer-readable program code portions comprising:

an executable portion that retrieves an approximation nearest neighbour (ANN) of a plurality of feature vectors in hyper-planes with dynamically variable subspaces by searching an inverted index, wherein the plurality of feature vectors, comprising real-valued vectors, are transformed into query pseudo-terms corresponding to a projection of one or more data points in a p-dimensional vector space having a variable number of cells depending upon a quantization interval, and wherein one or more of the variable number of cells in the p-dimensional vector space includes the one or more data points representing the query pseudo-terms.

16. The computer program product of claim 15, further including an executable portion that indexes a collection of the plurality of feature vectors using the hyper-planes, the inverted index, or a combination thereof.

17. The computer program product of claim 15, further including an executable portion that reads an output of the inverted index in a permutation order of dimensions of the dynamically variable subspaces.

18. The computer program product of claim 17, further including an executable portion that:

determines one or more union sets of one or more union points in the dynamically variable subspaces, wherein the dynamically variable subspaces are increasing; and restricts a true similarity computation on the union set.

19. The computer program product of claim 15, further including an executable portion that:

uses the inverted index to index the plurality of feature vectors in the dynamically variable subspaces; and determines exact distance of the plurality of feature vectors that are stored in a secondary storage.

20. The computer program product of claim 15, further including an executable portion that:

performs the transforming of each of the plurality of feature vectors into a document having one or more of the pseudo-query terms, wherein the one or more of the pseudo-query terms correspond to a projection of one or more data points in the dynamically variable subspaces;

determines one or more dynamically increasing variable subspaces and performing a selected logical operation on the one or more of the pseudo-query terms;

determines one or more union sets of one or more union of the one or more data points in the dynamically variable subspaces; and ranks or re-ranks a list of the union sets upon determining an exact similarity value of the one or more of the pseudo-query terms.

\* \* \* \* \*